(No Model.)
M. M. WOOD.
TROLLEY WIRE CLAMP.
No. 530,569. Patented Dec. 11, 1894.
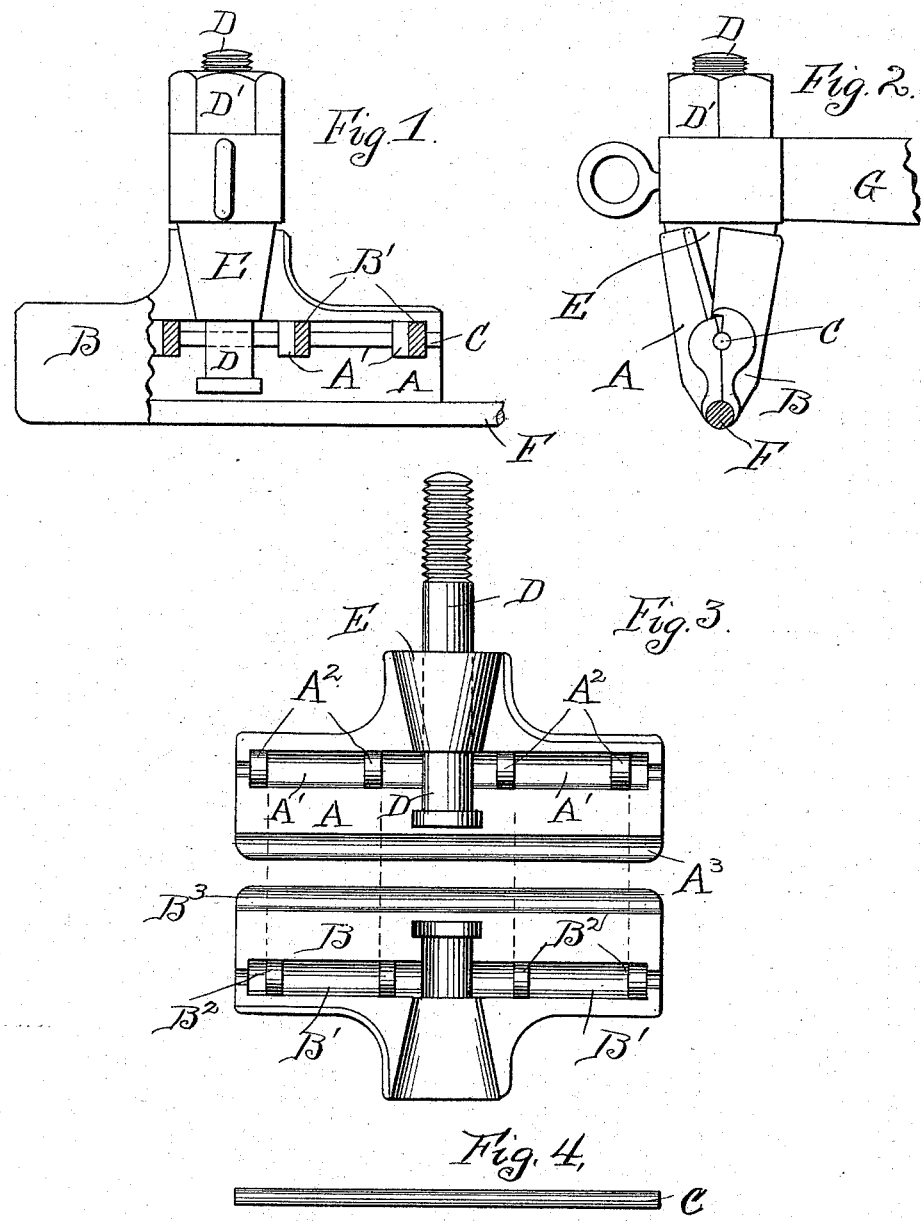

UNITED STATES PATENT OFFICE.

MONTRAVILLE M. WOOD, OF CHICAGO, ILLINOIS, ASSIGNOR TO THE OHIO BRASS COMPANY, OF MANSFIELD, OHIO.

TROLLEY-WIRE CLAMP.

SPECIFICATION forming part of Letters Patent No. 530,569, dated December 11, 1894.

Application filed July 2, 1894. Serial No. 516,330. (No model.)

*To all whom it may concern:*

Be it known that I, MONTRAVILLE M. WOOD, a citizen of the United States, residing at Chicago, in the county of Cook and State of Illinois, have invented certain new and useful Improvements in Trolley-Clamps, of which the following is a specification.

My invention relates to trolley wire clamps, and has for its object to produce an improved mechanical clamp of which the following is a description, reference being had to the accompanying drawings, wherein—

Figure 1 is a side view of clamp in position with parts broken away. Fig. 2 is an end view of same. Fig. 3 is a view with interlocking pin removed, and the two jaws spread apart. Fig. 4 is a view of interlocking pin.

Like letters refer to like parts throughout the several figures.

The clamp consists of the two jaws A B of bronze metal or the like, hinged together on an interlocking pin C. The jaw A is provided with the projecting semi-circular lugs $A^2 A^2$ which are rigid or integral therewith, and are separated by the grooves $A' A'$. The jaw B is provided with similar lugs $B^2 B^2$ and grooves $B' B'$. These lugs are provided with holes for the interlocking pin C. The jaws A and B are provided with grooves for the stud bolt D and are also recessed as shown to receive the head of said bolt. The stud bolt grooves expand at the top of the jaws so as to form a cone shaped opening when the jaws are together. Sliding loosely on the stud bolt D is the cone shaped wedge E which fits into this cone shaped opening. Said stud bolt is provided with a hole near its head for the pin C. At the bottom of the jaws A B are the grooves $A^3 B^3$ for the trolley wire F. As shown in Figs. 1 and 2 the clamp is attached to the single curve pull-over G. The stud bolt D passes through a hole in the end of the pull-over, the whole being held in place by the nut $D'$. The two jaws of the clamp are so constructed that when they are fastened together and the cone shaped wedge E removed they can be oscillated about the interlocking pin C so as to vary the distance between their clamping edges.

It is evident that the construction and arrangement of these several parts may be varied, as for example by increasing the number of lugs $A^2 B^2$, &c., without departing from the spirit of my invention, and I therefore do not wish to be limited to the exact construction shown.

The use and operation of my invention are as follows: The two jaws A and B are shown in Fig. 3 as spread apart. When it is desired to fasten the jaws together they are placed so that the lugs $A^2 A^2$ on the jaw A enter the grooves $B' B'$ on jaw B, and vice versa. See Fig. 1. The interlocking pin C is then passed through the holes in said lugs and in the bolt D. When it is desired to clamp the trolley wire the nut $D'$ is loosened and the cone shaped wedge E raised. The clamping edges can now be separated and the trolley inserted in the grooves $A^3 B^3$. If now the nut $D'$ is tightened the cone shaped wedge E is forced downwardly. This causes the upper edges of the clamps to move away from each other and the lower or clamping edges to move toward each other, since the two jaws are free to rock about the pin C, and the trolley wire is thus firmly clamped between the two jaws. I have shown the clamp in connection with a single curve pull-over, but it is evident that it can be used with any sort of hanger.

It will be seen that I have here a clamp that is strong and durable, and that will firmly grip the trolley wire and hold it in place, said clamp being so constructed that the trolley wheel will not spark when passing over it. The clamp can be adjusted or entirely removed from the trolley wire by partially unscrewing the nut $D'$.

I claim—

1. A trolley wire clamp comprising two jaws pivoted together, a stud bolt attached thereto by which the clamp is supported, and a wedge associated with said bolt and adapted to be moved with relation to said bolt and to the two jaws, whereby the distance between the clamping edges is varied by the movement of said wedge, substantially as described.

2. A trolley wire clamp comprising two jaws, each provided with projecting lugs, an interlocking pin passing through holes in said lugs whereby the jaws may be rocked about said pin, a stud bolt by which the clamp is supported, said bolt being provided with a head adapted to be received into recesses in the jaws of said clamp, substantially as described.

3. The combination in a trolley wire clamp of two jaws, each provided with projecting lugs, an interlocking pin passing through holes in said lugs, a stud bolt by which said clamp is supported, a cone shaped wedge encircling said stud bolt, a groove in each jaw for the reception of said wedge, and means for forcing said wedge into said grooves so as to spread the jaws apart at the top and cause their clamping edges to firmly grip the trolley wire, substantially as described.

MONTRAVILLE M. WOOD.

Witnesses:
WALTER J. GUNTHORP,
A. H. GEDDES.